(12) United States Patent
Hyodo et al.

(10) Patent No.: US 8,277,364 B2
(45) Date of Patent: Oct. 2, 2012

(54) CLUTCH CONTROL DEVICE FOR HYDRAULICALLY DRIVEN VEHICLE

(75) Inventors: Koji Hyodo, Kasumigaura (JP); Nobuhiro Suzuki, Ryugasaki (JP); Koji Takano, Tsukuba (JP); Genichiro Ishimaru, Inashiki (JP); Kazuo Ishida, Ryugasaki (JP); Kazuo Chonan, Moriya (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 673 days.

(21) Appl. No.: 12/526,448

(22) PCT Filed: Feb. 8, 2008

(86) PCT No.: PCT/JP2008/052159
§ 371 (c)(1),
(2), (4) Date: Aug. 7, 2009

(87) PCT Pub. No.: WO2008/096859
PCT Pub. Date: Aug. 14, 2008

(65) Prior Publication Data
US 2010/0317486 A1 Dec. 16, 2010

(30) Foreign Application Priority Data
Feb. 9, 2007 (JP) .................................. 2007-030145

(51) Int. Cl.
*B60W 10/04* (2006.01)
*B60W 10/10* (2006.01)

(52) U.S. Cl. ......................................... 477/115; 477/68

(58) Field of Classification Search .................... 477/52, 477/68, 115, 120, 156, 157, 159; 475/72, 475/76, 83
See application file for complete search history.

(56) References Cited

U.S. PATENT DOCUMENTS

| | | | |
|---|---|---|---|
| 6,276,134 B1 | 8/2001 | Matsuyama et al. | |
| 7,201,702 B2 * | 4/2007 | Legner | 477/52 |
| 7,637,101 B2 * | 12/2009 | Uezono et al. | 60/425 |
| 2005/0233857 A1 * | 10/2005 | Horiuchi et al. | 477/120 |
| 2009/0045003 A1 | 2/2009 | Shirao et al. | |

FOREIGN PATENT DOCUMENTS

| | | |
|---|---|---|
| DE | 11 2006 002 950 | 11/2008 |
| JP | 11-166623 A | 6/1999 |
| JP | 11-230333 A | 8/1999 |
| JP | 2000-74184 A | 3/2000 |
| WO | WO 2005/111475 A1 | 11/2005 |

OTHER PUBLICATIONS

International Search Report dated May 20, 2008 with English translation (six (6) pages).
Supplementary European Search Report dated Aug. 5, 2011 (eight (8) pages).

\* cited by examiner

*Primary Examiner* — Justin Holmes
(74) *Attorney, Agent, or Firm* — Crowell & Moring LLP

(57) ABSTRACT

A first motor 3 and a second motor 4 of variable displacement type are in parallel to each other connected to a hydraulic pump 2 in a closed circuit, through which the output torque from the first motor 3 is transmitted to an output shaft 6. A clutch control unit 10 controls a clutch device 15 as: when the engine speed is N1, which is the case where the accelerator pedal is fully depressed, the clutch is disengaged at the vehicle speed v1. When the engine speed is N3(<N1), which is the case where the accelerator pedal is half depressed, the clutch is disengaged at the vehicle speed v3(<v1).

9 Claims, 10 Drawing Sheets

CLUTCH CONTROL DEVICE FOR HYDRAULICALLY DRIVEN VEHICLE

TECHNICAL FIELD

The present invention relates to a clutch control device for hydraulically driven vehicle that uses the output of a plurality of variable displacement hydraulic motors so as to drive a vehicle.

BACKGROUND ART

There is a clutch control device known in the related art that, after the displacement of one hydraulic motor becomes zero, disengages the clutch connected to the hydraulic motor and uses only the output of the other hydraulic motor so as to drive the vehicle (refer to, for example, patent reference literature 1). The device disclosed in Patent Reference Literature #1 disengages the clutch when the vehicle speed becomes greater than or equal to a predetermined value after the displacement of the hydraulic motor becomes zero.

Patent Reference Literature 1: Japanese Laid Open Patent Publication No. H11-230333

DISCLOSURE OF THE INVENTION

Problems to be Solved by the Invention

In the device disclosed in Patent Reference Literature #1, the predetermined value is set on the assumption of travel motion with the accelerator fully depressed. Accordingly, in the case of travel motion with the accelerator half depressed, the displacement becomes equal to zero at a speed less than the predetermined value and the clutch remains engaged with zero displacement until the vehicle speed becomes equal to the predetermined value. This results in wasteful consumption of engine output and great loss.

Means for Solving the Problems

A clutch control device for hydraulically driven vehicle according to the present invention comprises: a hydraulic pump that is driven by an engine; a first variable displacement hydraulic motor that is connected to the hydraulic pump in a closed-circuit and is driven by pressure oil from the hydraulic pump; a second hydraulic motor, which is one of a variable displacement type and a fixed displacement type, that is connected in parallel to the first hydraulic motor and is driven by pressure oil from the hydraulic pump; a travel drive shaft that is driven by outputs of the first hydraulic motor and the second hydraulic motor; a displacement control device that controls displacement of the first hydraulic motor between zero and a maximum displacement in accordance with load; a clutch device that engages or disengages a drive-train between the first hydraulic motor and the travel drive shaft; an engine speed detection unit that detects rotational speed of the engine; a vehicle speed detection unit that detects vehicle speed; and a clutch control unit that controls the clutch device in response to detected engine speed and vehicle speed, wherein: the clutch control unit controls the clutch device when vehicle speed increases so as to disengage the drive-train at a first vehicle speed in the case where a first engine speed has been detected, and so as to disengage the drive-train at a second vehicle speed, which is less than the first vehicle speed, in the case where a second engine speed, which is less than the first engine speed, has been detected.

It is preferable to control the clutch device so that a vehicle speed at which the drive-train is disengaged increases substantially linearly with an increase in engine speed.

The clutch device may be controlled so as to engage the drive-train regardless of engine speed when a detected vehicle speed is less than a predetermined lower limit vehicle speed and so as to disengage the drive-train regardless of engine speed when a detected vehicle speed is greater than a predetermined upper limit vehicle speed.

A setting unit may be further included that sets vehicle speed at which the drive-train is disengaged to a predetermined lower limit value regardless of engine speed when an engine speed is in a low speed range, increases substantially linearly vehicle speed at which the drive-train is disengaged with an increase in engine speed when an engine speed is in a middle speed range, and sets vehicle speed at which the drive-train is disengaged to a predetermined upper limit value regardless of engine speed when an engine speed is in a high speed range, and the clutch device may be controlled according to characteristics set by the setting unit.

It is also possible that, after the drive-train is disengaged, when vehicle speed decreases the clutch control unit engages the drive-train at a third vehicle speed which is less than the first vehicle speed in the case where the first engine speed has been detected, and engages the drive-train at a fourth vehicle speed which is less than the second vehicle speed in the case where the second engine speed has been detected.

An engine speed control device may be further included that increases engine speed with an increase in amount of operation of an accelerator pedal, and it is acceptable that the first engine speed corresponds to an engine speed at which the accelerator pedal is fully operated, and the second engine speed corresponds to an engine speed at which the accelerator pedal is half operated.

Moreover, the present invention may include: a pressure detection unit that detects load pressure exerted on the first hydraulic motor and the second hydraulic motor; and a clutch control unit that controls the clutch device so as to disengage the drive-train when a detected load pressure is less than or equal to a predetermined value.

Furthermore, the present invention may include: a flow rate detection unit that detects flow rate flowing through the first hydraulic motor; and a clutch control unit that controls the clutch device so as to disengage the drive-train when a detected flow rate is less than or equal to a predetermined value.

Moreover, the present invention may include: a tilting angle detection unit that detects tilting angle of the first hydraulic motor; and a clutch control unit that controls the clutch device so as to disengage the drive-train when a detected tilting angle is less than or equal to a predetermined value.

Advantageous Effect of the Invention

According to the present invention, a clutch is prevented from being engaged while the displacement of the hydraulic motor being zero, thereby reducing engine output loss.

A hydraulic circuit diagram for travelling of the configuration of a clutch control device related to an embodiment of the present invention.

FIG. 2

Figure 1:
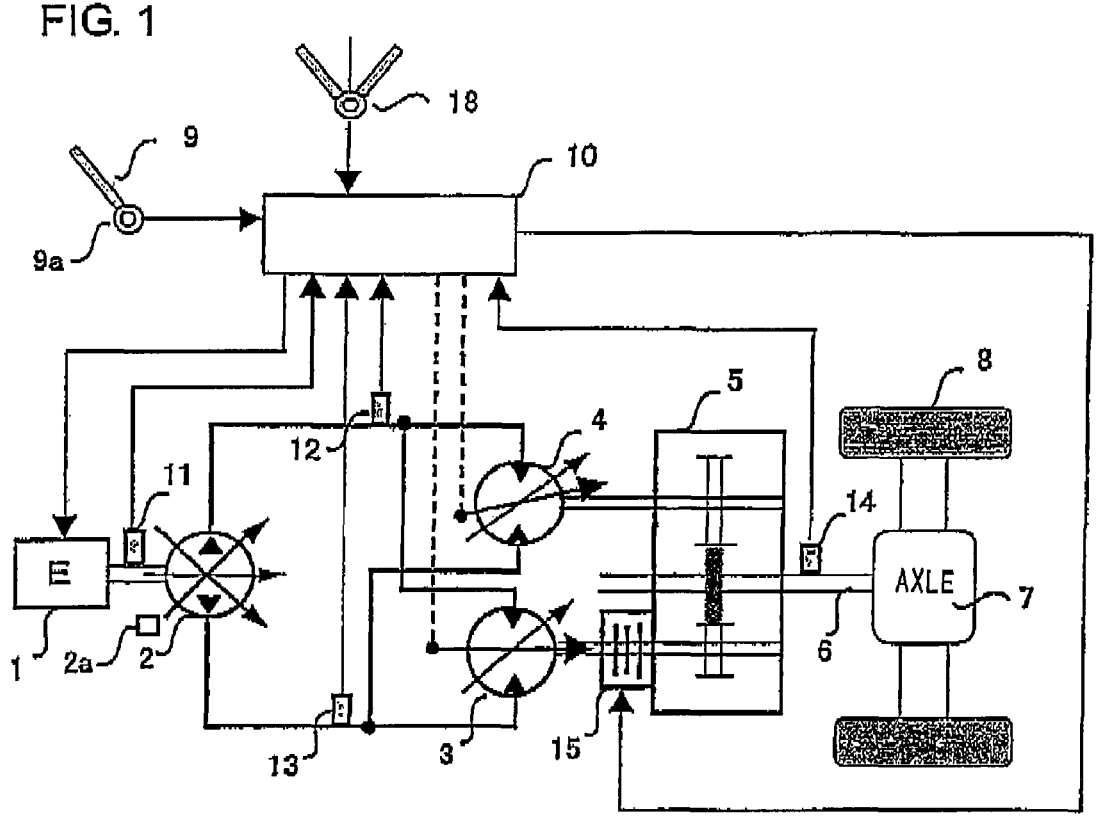
FIG. 1

An example of the displacement control characteristics of the hydraulic motor of FIG. 1.

FIG. 3

An example of a travel performance diagram of a wheel loader.

FIG. 4

An example of a clutch control when the accelerator pedal is fully depressed.

FIG. 5

A diagram of the characteristics of clutch-off vehicle speed and clutch-on vehicle speed.

FIG. 6

A flowchart of an example of processing executed by a controller of FIG. 1.

FIG. 7

A flowchart of an example of processing as a first modification.

FIG. 8

A travel motion hydraulic circuit diagram of the configuration of a second modification.

FIG. 9

A flowchart of an example of processing as the second modification.

FIG. 10

A flowchart of an example of processing as a third modification.

BEST MODE FOR CARRYING OUT THE INVENTION

The following is an explanation of the embodiment of the clutch control device for hydraulically driven vehicle according to the present invention, in reference to FIGS. 1~6.

FIG. 1 is a hydraulic circuit diagram for travelling of the configuration of a clutch control device related to a present embodiment. The clutch control device is applied to, for instance, a wheel loader. A hydraulic pump 2, driven by an engine 1, includes a pair of hydraulic motors (a first motor 3 and a second motor 4) connected in parallel to each other in a closed-circuit, thereby forming a so-called HST drive circuit. When the hydraulic motors 3 and 4 rotate on pressure oil from the hydraulic pump 2, output torques of the hydraulic motors 3 and 4 are transmitted to an output shaft 6 through a gearbox 5. This allows tires 8 to rotate via an axle 7, thereby allowing the vehicle to travel.

At this time, output torque of the first motor 3 is input to the gearbox 5 through a clutch device 15. The actuation of the clutch device 15 is controlled by a controller 10. More specifically, the controller 10 outputs a clutch-on signal so as to turn the clutch device 15 on. This clutch-on allows a drive-train between the first motor 3 and the output shaft 6 to engage, thereby transmitting output torque of the first motor 3 to the tires 8. The controller 10 outputs a clutch-off signal so as to turn the clutch device 15 off. This clutch-off allows the drive-train between the first motor 3 and the output shaft 6 to disengage, thereby blocking torque transmission from the first motor 3 to the output shaft 6.

Signals from an operation amount detector 9a that detects the operation amount of an accelerator pedal 9, a back and forth movement selector switch 18 that instructs back and forth movement of the vehicle, a rotation speed sensor 11 that detects the number of rotations of the engine (engine speed), pressure sensors 12 and 13 that detect load pressure (motor drive pressure) of the HST circuit at advancing and at reversing, and a vehicle speed sensor 14 that detects the vehicle speed are each input to the controller 10. By operating the accelerator pedal 9, a desired rotation speed of the engine 1 is input, so that the controller 10 controls the engine speed as per the desired rotation speed detected by the operation amount detector 9a. In other words, the controller 10 functions as an engine speed control device that increases the engine speed when the operation amount of the accelerator pedal 9 is increased.

The hydraulic pump 2 is a variable displacement pump and the displacement amount thereof, i.e., the pump capacity is controlled by a displacement control device 2a. The displacement control device 2a, which is not figured herein, includes a cylinder for displacement and a back and forth movement selector valve that switches in response to operation of the back and forth movement selector switch 18. The displacement cylinder is supplied with control pressure through the back and forth movement selector valve, and the displacement amount of the pump is controlled in accordance to the control pressure. At the same time, the operational direction of the displacement cylinder is controlled in response to the switch of the back and forth movement selector valve, and the discharge direction of the hydraulic pump 2 is controlled. Control pressure increases in proportion to the increase in engine speed, and, when the control pressure increases, the pump displacement amount increases. As a result, when the engine speed increases, the rotation speed and the displacement amount of the hydraulic pump 2 both increase, and therefore the pump discharge amount smoothly increases with excellent response in response to increase in engine speed, so that a smooth, dynamic acceleration can be achieved.

Figure 2:
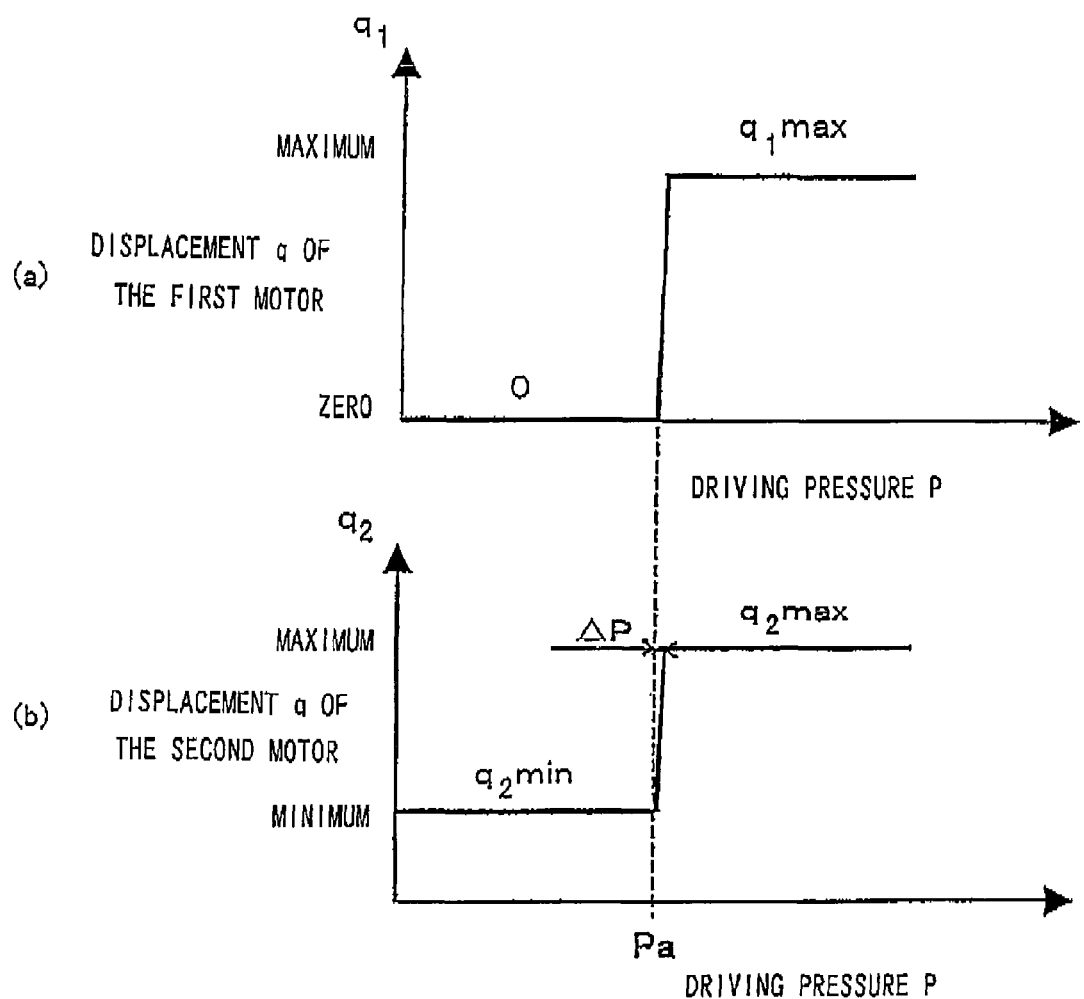

The hydraulic motors 3 and 4 are both variable displacement motors. A control signal is output from the controller 10 to the displacement control device, which is not figured herein, so as to control the displacement amount of the motors (motor capacity). FIGS. 2 (a) and (b) respectively show an example of displacement control characteristics of the first motor 3 and the second motor 4, wherein the horizontal axis represents HST driving pressure P and the vertical axis represents the displacement q of the motor.

As FIG. 2 (a) shows, the displacement q1 of the first motor 3 is equal to zero (q1=0) in a range where the motor driving pressure P is less than or equal to a predetermined value Pa, on the other hand, it increases from zero to the maximum q1max in response to load when the motor driving pressure P becomes greater than or equal to the predetermined value Pa. When the displacement q1 becomes equal to zero, flow of pressure oil from the hydraulic pump 2 to the first motor 3 is blocked, rotation of the first motor 3 by pump discharge oil is blocked.

On the other hand, as FIG. 2 (b) shows, the displacement q2 of the second motor 4 is equal to the minimum q2min (>0) in a range where the motor driving pressure P is less than or equal to the predetermined value Pa, while it increases from the minimum q2min to the maximum q2max in response to load when the motor driving pressure P becomes greater than or equal to the predetermined value Pa. The displacement q2 of the motor is controlled according to the characteristics of FIG. 2 (b) when the vehicle speed becomes greater than or equal to a clutch-off vehicle speed Voff mentioned below, on the other hand, the displacement q2 of the motor is held at the maximum q2max regardless of travel load when the vehicle speed is less than or equal to the clutch-off vehicle speed Voff. It is to be noted that although in FIGS. 2 (a) and (b) the driving pressure P of a point at which the respective displacements become equal to the maximum q1max and the maximum q2max so as to perform a stable motor displacement control is greater than Pa by ΔP, description below assumes ΔP=0 for simplicity.

Figure 3:
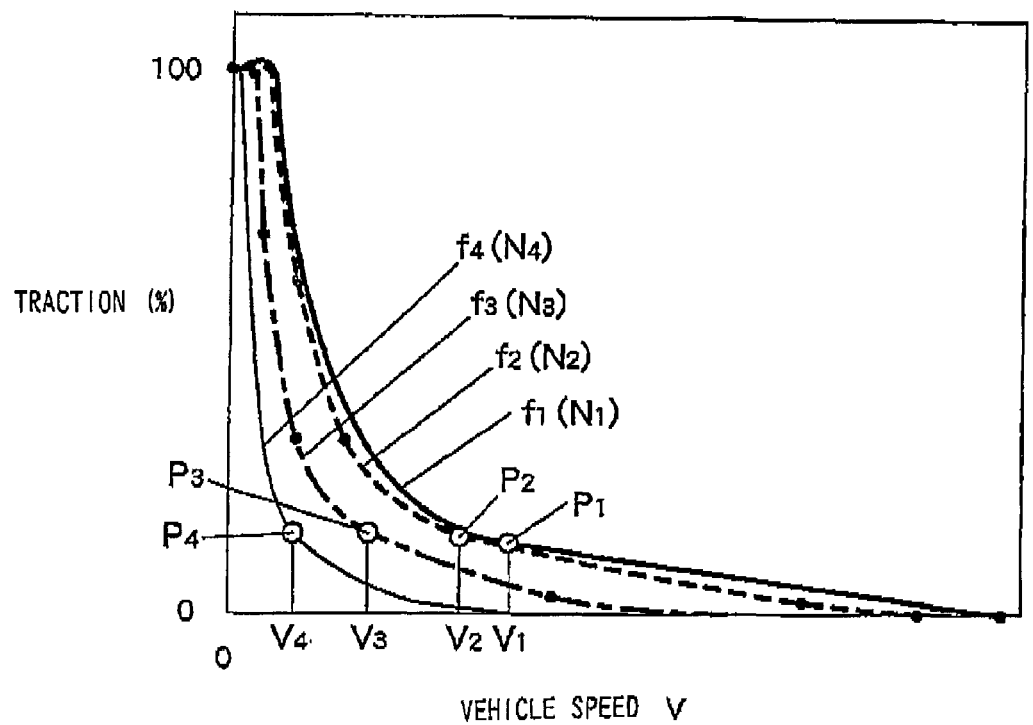

FIG. 3 is an example of a travel performance diagram of a wheel loader. In FIG. 3, the horizontal axis represents the vehicle speed v and the vertical axis represents the proportion of traction (%) with respect to the maximum traction. A characteristic f1 is a travel performance diagram of the accelerator pedal 9 when being fully operated (fully depressed). A characteristic f3 is a travel performance diagram thereof when being half operated (half depressed). A characteristic f2 is a travel performance diagram thereof which corresponds to an operation between the full operation and the half operation. A characteristic f4 is a travel performance diagram thereof which corresponds to an operation lighter than the half operation. The characteristics f1-f4 each exhibit traction that decreases with an increase in vehicle speed. Given that engine speeds corresponding to the characteristics f1-f4 are N1-N4, respectively, N1-N4 have a relationship expressed as N1>N2>N3>N4, which indicates that a lower engine speed results in a more decreased product of vehicle speed and traction, i.e., the value of power available for travel motion is decreased.

The characteristics f1-f4 indicate that decrease in travel traction results in decrease in motor output torque, thereby decreasing the displacement q1 of the first motor 3 (FIG. 2). As a result, the displacement q1 of the first motor 3 becomes equal to zero, for example, at respective points P1-P4 on the characteristics f1-f4. Vehicle speeds v1-v4 at the respective points P1-P4 have a relationship expressed as v1>v2>v3>v4, which indicates that a lower engine speed results in the displacement q1 of the first motor 3 becoming equal to zero at a lower vehicle speed.

Figure 4:
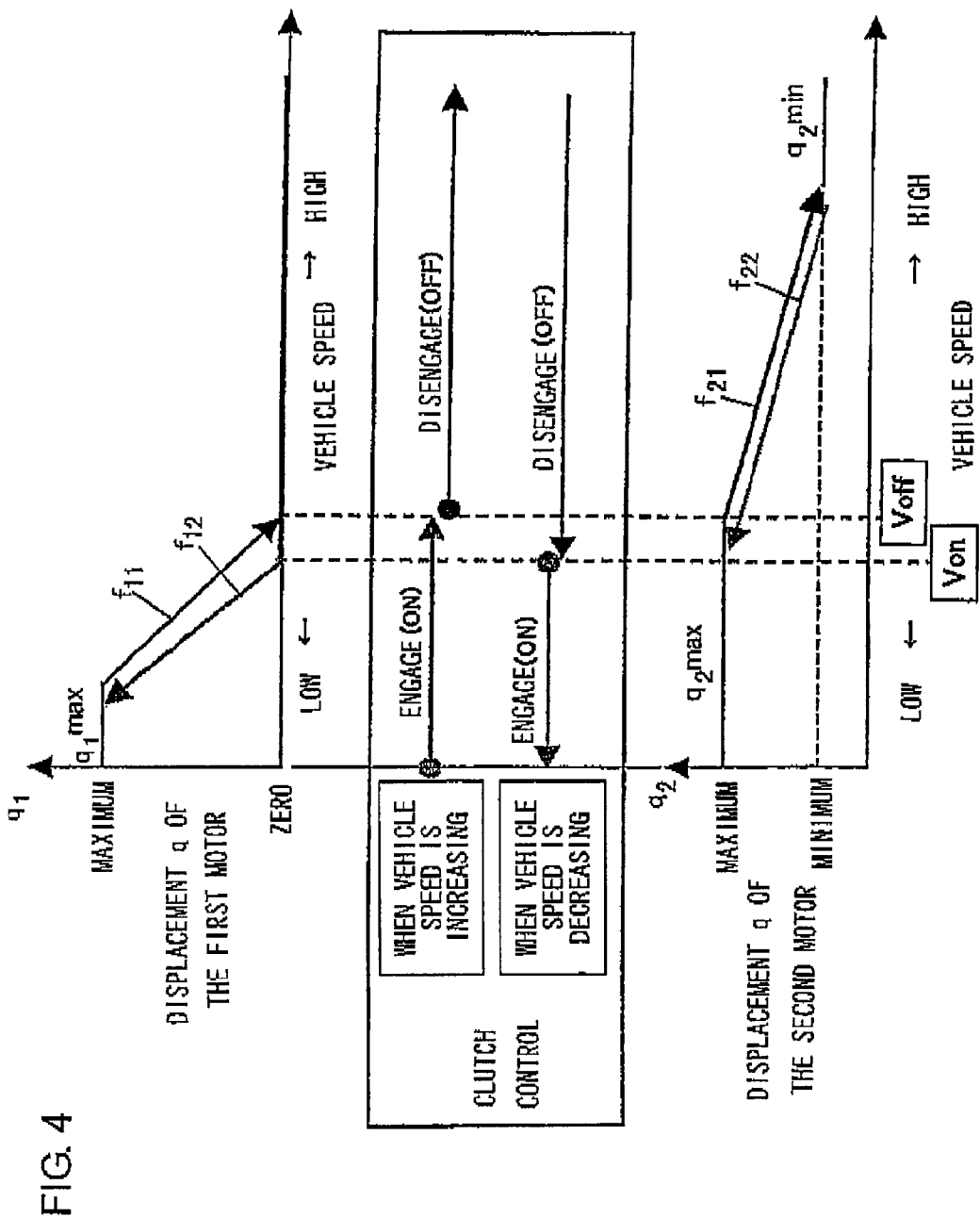

FIG. 4 shows an example of a clutch control related to the present embodiment. In FIG. 4, a characteristic f11 represents the relationship between vehicle speed at accelerating operation by full operation of the accelerator pedal 9 and the displacement q1 of the first motor 3, while a characteristic f12 represents the relationship between vehicle speed at decelerating operation and the displacement q1 of the first motor 3. A characteristic f21 represents the relationship between vehicle speed at accelerating operation by full operation of the accelerator pedal 9 and the displacement q2 of the second motor 4, while a characteristic f22 represents the relationship between vehicle speed at decelerating operation and the displacement q2 of the second motor 4.

When the accelerator pedal 9 is fully depressed so as to drive the vehicle, as the characteristic f11 shows, the displacement q1 of the first motor 3 decreases with a decrease in travel load, so that it becomes equal to zero at the vehicle speed Voff (=v1 of FIG. 3), for example. At this time, decrease in the displacement q1 causes vehicle speed v to increase. Here, when a clutch-off signal is output from the controller 10 at the vehicle speed Voff, the clutch device 15 is turned off and the first motor 3 is disconnected from the output shaft 6. At this time, as the characteristic f21 shows, although the displacement q2 of the second motor 4 is held at the maximum q2max until the vehicle speed becomes Voff, the displacement q2 is controlled in response to load when the vehicle speed is greater than or equal to Voff and, in the case where the motor driving pressure P is less than Pa, it decreases to q2min. This increases the vehicle speed v, thereby enabling travel motion at high speed with low torque.

On the other hand, while traveling at the maximum vehicle speed, when the vehicle speed is reduced due to either decelerating operation of the accelerator pedal 9 or increase in travel load, as the characteristic f22 shows, the displacement q2 of the second motor 4 increases from the minimum q2min to the maximum q2max. When the vehicle speed becomes less than or equal to Voff, the displacement q2 of the second motor 4 is held at the maximum q2max. When the vehicle speed decreases to Von (<Voff), a clutch-on signal is output from the controller 10 and the clutch device 15 is turned on, thereby connecting the first motor 3 with the output shaft 6. At this time, as the characteristic f12 shows, the displacement q1 of the first motor 3 is controlled in response to load and, in the case where the motor driving pressure P is greater than Pa, the displacement q1 increases to q1max. This results in decrease in vehicle speed, thereby enabling travel motion at low speed with high torque.

As described above, in a state where the accelerator pedal 9 is fully operated, the displacement of the first motor 3 becomes equal to zero at the vehicle speed Voff (=v1). Therefore, clutching-off at the vehicle speed Voff prevents rotation of the first motor 3 caused by rotation of the shaft 6. As a result, travel resistance decreases, thereby reducing engine output loss. In other words, though a torque is necessary to drive a motor of even zero displacement, of which torque we call here the loss torque at zero displacement, it is possible to avoid generation of the loss torque at zero displacement by turning off the clutch after the displacement has become zero.

The vehicle speed at which the displacement of the first motor 3 becomes equal to zero depends on engine speed (FIG. 3). For instance, when the accelerator pedal 9 is half operated, the displacement of the motor becomes equal to zero at the vehicle speed v3. Accordingly, as long as the clutch-off vehicle speed Voff (=v1) is equally determined based on the full operation regardless of the engine speed, great loss is caused because the output shaft 6 causes the first motor 3 to unnecessarily rotate while the vehicle speed increases from v3 to v1 at the half operation. Therefore, in the present embodiment, as FIG. 5 shows, characteristics of the clutch-off vehicle speed Voff and the clutch-on vehicle speed Von are set in accordance with engine speed, and the clutch device 15 is controlled based on this characteristics.

Figure 5:
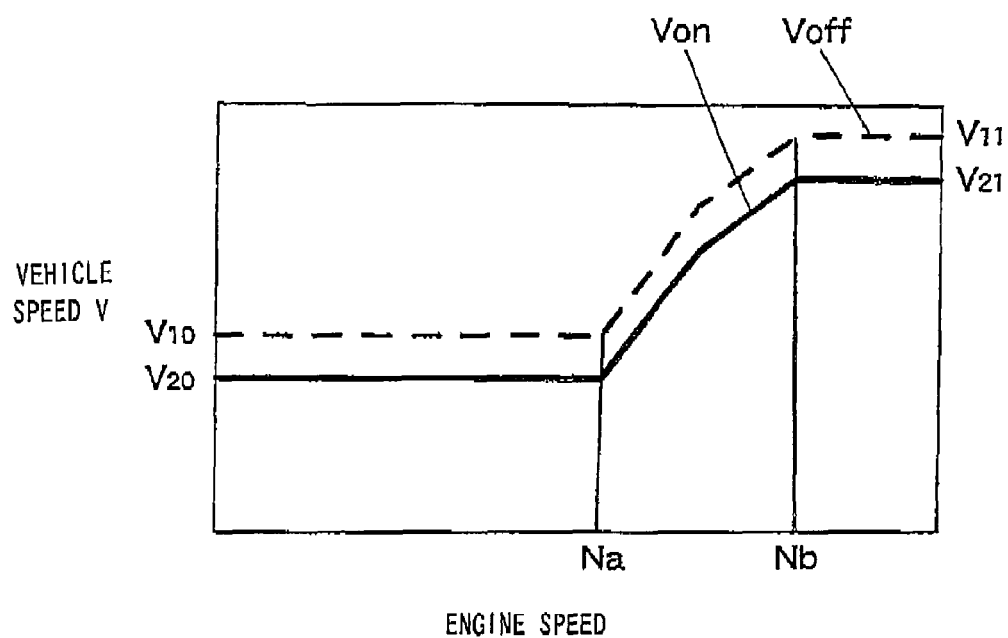

In FIG. 5, the clutch-off vehicle speed Voff is set so as to be held at a predetermined value v10 until the engine speed increases up to a predetermined value Na, so as to increase almost proportionally (linearly) with an increase in the engine speed when the engine speed is greater than or equal to the predetermined value Na and less than or equal to a predetermined value Nb, and so as to be held at a predetermined value v11 after the engine speed exceeds the predetermined value Nb. On the other hand, the clutch-on vehicle speed Von is set so as to be held at a predetermined value v20 until the engine speed increases up to the predetermined value Na, so as to increase almost proportionally (linearly) with an increase in the engine speed when the engine speed is greater than or equal to the predetermined value Na and less than or equal to the predetermined value Nb, and so as to be held at a predetermined value v21 after the engine speed exceeds the predetermined value Nb.

More specifically, the clutch-off vehicle speed Voff changes between the lower limit value v10 and the upper limit value v11 in accordance with the engine speed, while the clutch-on vehicle speed Van is set to be less than the clutch-off vehicle speed Voff by a predetermined speed (for example, around 1.5 km/h) throughout the engine speed range. The clutch-off vehicle speed Voff when the engine speed is between Na and Nb corresponds to a vehicle speed (for instance, v1-v3 of FIG. 3) at which the displacement q1 of the motor becomes equal to zero. The clutch-off vehicle speed Voff is obtained by calculation, experiment, etc.

The characteristics presented in FIG. 5 are stored in the controller 10 in advance. The controller 10 includes a processing unit that includes a CPU, a ROM, a RAM, other peripheral circuits, and so on. The CPU performs processing as to on/off of the clutch device 15 as described below.

Figure 6:
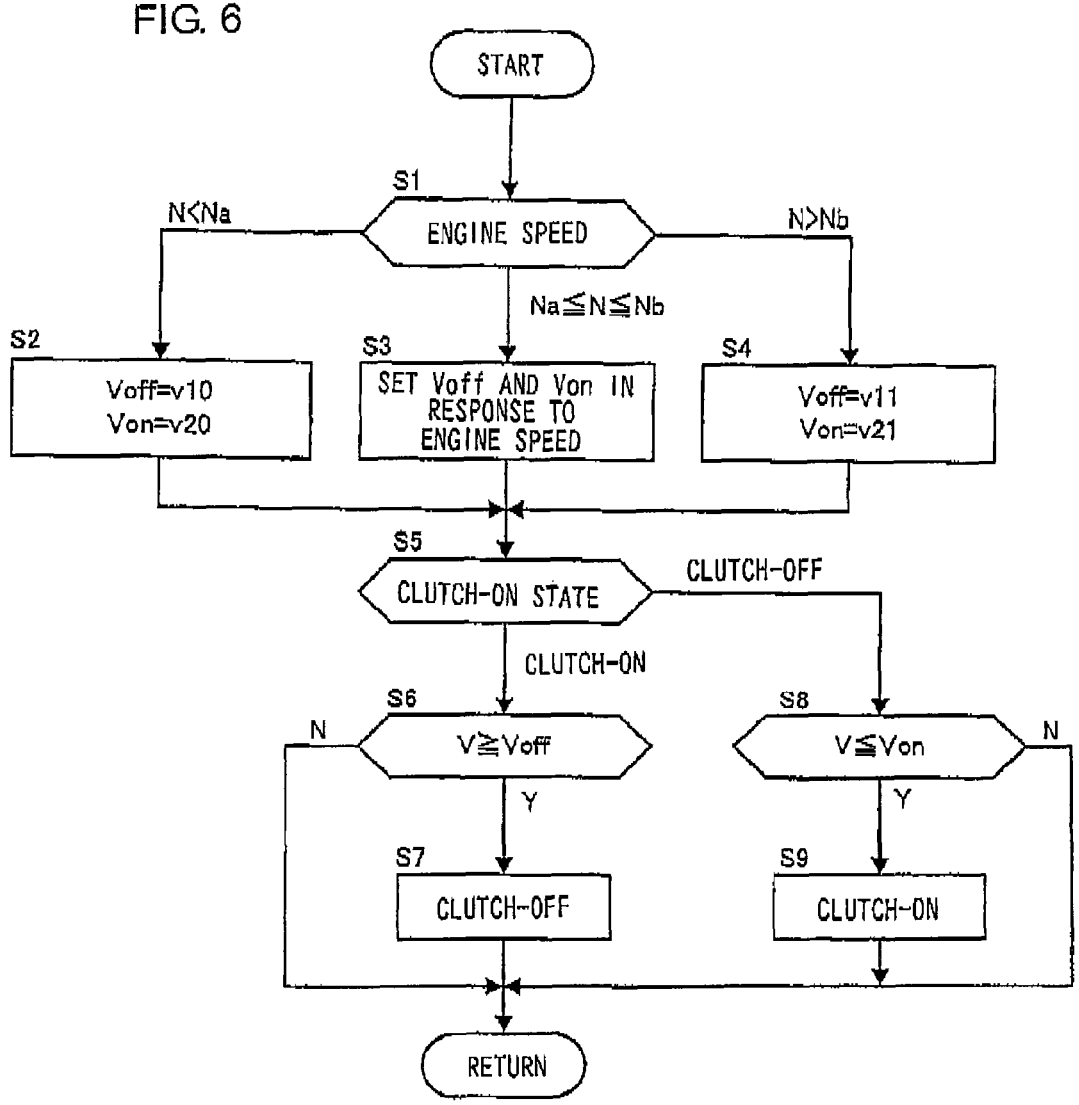

FIG. 6 is a flowchart of an example of processing executed by the controller 10 (CPU). The flow chart starts, for example, upon switch-on of the engine key. In step S1, magnitude of the engine speed is judged based upon a signal from the rotation speed sensor 11. In step S1, if it is judged that the engine speed is greater than or equal to the predetermined value Na and less than or equal to the predetermined value Nb, the flow of control proceeds to step S3, where the clutch-off vehicle speed Voff and the clutch-on vehicle speed Von are set in response to the engine speed based upon the characteristics of FIG. 5.

In the step S1, if it is judged that the engine speed is less than the predetermined value Na, the flow of control proceeds to step S2, where the lower limit values v10 and v20 of FIG. 5 are set as the clutch-off vehicle speed Voff and the clutch-on vehicle speed Von, respectively. The lower limit value v10 is set so that the clutch is not turned off even if a wheel loader performs excavation and load operations while traveling at low speed, and therefore it is set in consideration of the vehicle speed during operation. For instance, the lower limit value v10 is set to a value between the vehicle speeds v3 and v4 of FIG. 3.

On the other hand, in the step S1, if it is judged that the engine speed is greater than the predetermined value Nb, the flow of control proceeds to step S4, where the upper limit values v11 and v21 of FIG. 5 are set as the clutch-off vehicle speed Voff and the clutch-on vehicle speed Von, respectively. The upper limit value v11 of the clutch-off vehicle speed corresponds to the vehicle speed v1 of travel with the accelerator fully depressed, and is set to a value that does not exceed the maximum allowable rotation speed of the first motor 3. The upper vehicle speed v11 depends upon the gear ratio setting of the gearbox 5.

After completing the settings of the clutch-off vehicle speed Voff and the clutch-on vehicle speed Von, the flow of control proceeds to step S5, in which a decision is made as to whether or not the clutch device 15 is in a state of clutch-on, in other words, whether or not a clutch-on signal has been output to the clutch device 15.

If it is judged in the step S5 that the clutch device 15 is in a state of clutch-on, the flow of control proceeds to step S6, where it is judged as to whether or not the vehicle speed v detected by the vehicle speed sensor 14 has become greater than or equal to the clutch-off vehicle speed Voff. If the judgement is affirmative in the step S6, the flow of control proceeds to step S7, where a clutch-off signal is output to the clutch device 15 and the clutch device 15 is turned off.

If it is judged in the step S5 that the clutch device 15 is in a state of clutch-off, the flow of control proceeds to step S8, where it is judged as to whether or not the vehicle speed v detected by the vehicle speed sensor 14 has become less than or equal to the clutch-on vehicle speed Von. If the judgement is affirmative in the step S8, the flow of control proceeds to step S9, where a clutch-on signal is output to the clutch device 15 and the clutch device 15 is turned on.

Key actions of the clutch control device related to the present embodiment will now be explained.

If the accelerator pedal 9 is depressed to drive the vehicle with the clutch device 15 turned on, the displacement q1 of the first motor 3 changes in response to load until the vehicle speed increases up to Voff, and the displacement of the second motor 4 is held at the maximum q2max. At this time, the engine speed is N1 if, for instance, the accelerator pedal 9 is fully operated, and the vehicle speed increases up to v1 (Voff) if the displacement q1 of the motor becomes equal to zero due to decrease in travel load in that state. This causes the clutch device 15 to be turned off, causes the first motor 3 to be disconnected from the output shaft 6, and prevents rotation of the first motor 3 caused by rotation of the output shaft 6.

On the other hand, with the clutch device 15 turned on, the engine speed is N3 if the accelerator pedal 9 is half operated, and the vehicle speed increases up to v3 (Voff) if the displacement q1 of the motor becomes equal to zero due to decrease in travel load in that state. In this case, even if the vehicle speed does not increase up to v1, the clutch device 15 is turned off, and the first motor 3 is disconnected from the output shaft 6. This prevents the loss torque at zero displacement from being generated, thereby improving the fuel economy. In addition, acceleration of the vehicle is also improved.

In the case where the bucket is operated so as to perform excavation and load operations while the vehicle is in motion, the vehicle speed is less than or equal to the lower limit value v10 of the clutch-off vehicle speed Voff, wherein the clutch device 15 is always turned on. Therefore, driving force of the first motor 3 can be transmitted to the tires 8 without delay when the bucket is plunged to the ground, thereby preventing impact caused by torque deficiency or on/off of the clutch from being generated. As a result, working efficiency is improved, as well as, ride quality and operability for the operator are improved.

When the vehicle travels downhill with the accelerator pedal 9 being operated, the engine 1 may over-rotate due to reduced travel load, and the vehicle speed may become greater than or equal to the upper limit value vii of the clutch-off vehicle speed Voff. In this case, since the clutch device 15 is turned off whenever the vehicle speed exceeds the upper limit value v11, the first motor 3 is not caused to rotate by the output shaft 6, thereby preventing damage caused by the over-rotation of the motor 3. In addition, since turning-off of the clutch device 15 prevents travel load from being applied to the first motor 3 and the displacement of the first motor 3 becomes equal to zero, over-rotation of the motor 3 caused by pressure oil from the hydraulic pump 2 is prevented.

It is to be noted that although, in the above, operation has been explained for the case in which the clutch device 15 is turned off depending upon the vehicle speed in response to the engine speed when the vehicle speed increases, the clutch device 15 is turned on, in a similar manner, depending upon the vehicle speed in response to the engine speed when the vehicle speed decreases. In this case, since the clutch-on vehicle speed Von is set to be less than the clutch-off vehicle speed Voff throughout the whole engine speed range, on/off control of the clutch is stably performed.

According to the above embodiment, the following operations and advantageous effects can be achieved.

(1) It is arranged that the clutch device 15 is turned off at a vehicle speed v1 when the accelerator pedal 9 is fully operated, while the clutch device 15 is turned off at a vehicle speed v3, which is less than v1, when the accelerator pedal 9 is half operated. In other words, with a higher engine speed, the clutch device 15 is turned off at a higher vehicle speed. This prevents the first motor 3 from rotating when the displacement thereof is equal to zero in a vehicle speed range of v3~v1, prevents zero displacement loss torque from being generated, and thus improves fuel economy.

(2) Since it is arranged that the clutch-off vehicle speed Voff increases almost linearly with an increase in engine speed when the engine speed is between Na and Nb, the vehicle speed becomes the clutch-off vehicle speed Voff when the displacement of the first motor 3 becomes equal to zero, thereby efficiently preventing the loss torque at zero displacement from being generated.

(3) Since the lower limit value v10 is set for the clutch-off vehicle speed Voff, a wheel loader can perform excavation and load operations while traveling at low speed without disengaging the clutch, thereby improving working efficiency.

(4) Since the upper limit value v20 is set for the clutch-off vehicle speed Voff, over-rotation of the motor 3 when the vehicle travels downhill can be prevented, thereby preventing damage in the motor 3.

(5) Since the clutch-on vehicle speed Von is set to less than the clutch-off vehicle speed Voff throughout the whole engine speed range, on/off control of the clutch is stably performed.

It is to be noted that the present invention is characterized by the feature in that the clutch device 15 is controlled so as to prevent the loss torque at zero displacement from being generated, and various modifications may be made.

—The First Modification—

Figure 7:
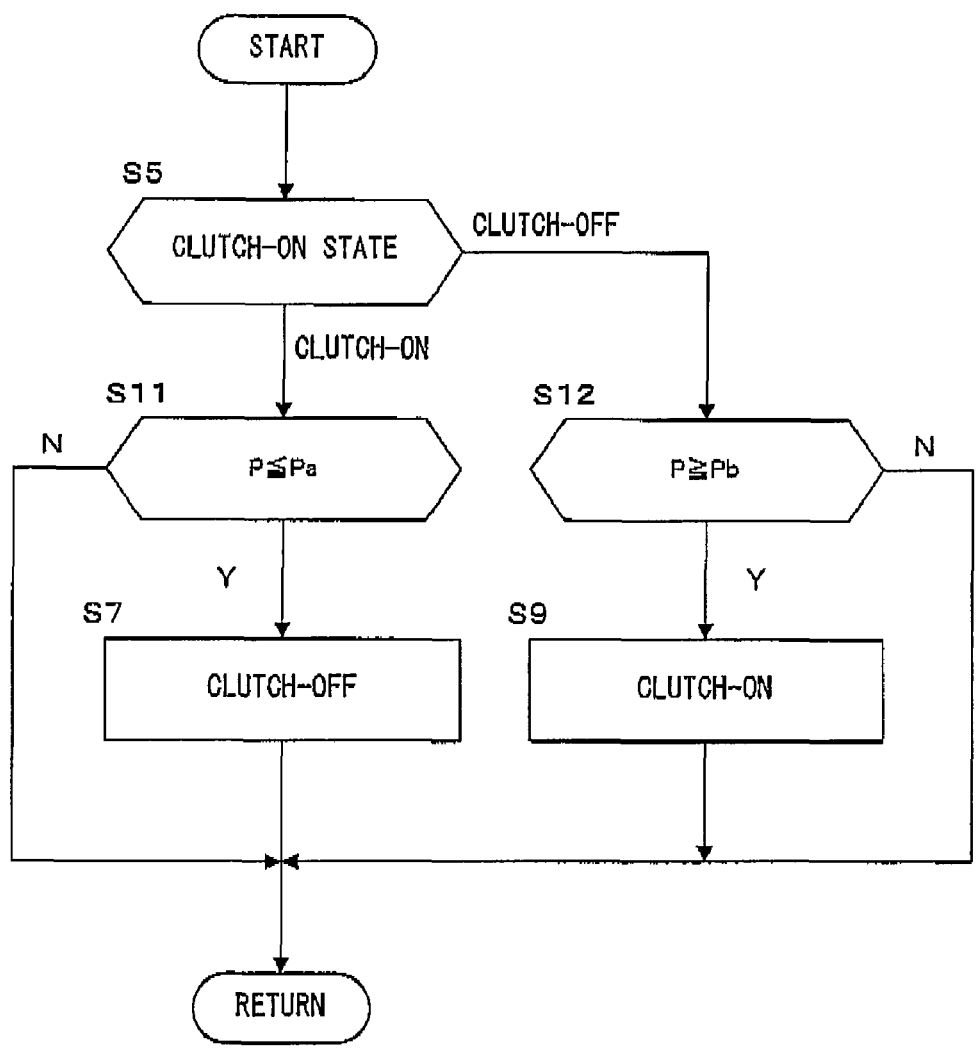

In the above embodiment, the clutch device 15 is controlled in accordance with the engine speed and the vehicle speed. However, since the loss torque at zero displacement is generated when the motor driving pressure P is low, the clutch device 15 may be controlled in accordance with, for instance, the motor driving pressure P. FIG. 7 is a flowchart showing an example of processing by the controller 10 related to the first modification. It is to be noted that the same reference numerals are assigned to processes identical to those in FIG. 6.

The motor driving pressure Pa (FIG. 2), at which the displacement q1 of the motor becomes zero, is stored in the controller 10. Pa is obtained by an experiment. In FIG. 7, if it is judged that the clutch is on in the step S5, the flow of control proceeds to a step S11, where it is judged as to whether the motor driving pressure P, for which the greater one of the values detected by the pressure sensors 12 and 13 is adopted, is less than or equal to the predetermined value Pa. If the judgement is affirmative in the step S11, the flow of control proceeds to the step S7, where the clutch device 15 is turned off. This prevents the clutch from being engaged at the zero displacement of with the hydraulic motor 3, thereby preventing the loss torque at zero displacement from being generated.

On the other hand, if it is judged that the clutch is off in the step S5, the flow of control proceeds to a step S12, where it is judged as to whether the motor driving pressure P, for which the greater one of the values detected by the pressure sensors 12 and 13, is greater than or equal to a predetermined value Pb. The predetermined value Pb is set to greater than Pa for the purpose of control stability. If the judgement is affirmative in the step S12, the flow of control proceeds to the step S9, where the clutch device 15 is turned on. It is to be noted that although, in the above, the pressure sensors 12 and 13 detect load pressure exerted on the motors 3 and 4, another pressure sensor may be used.

—The Second Modification—

Figure 8:
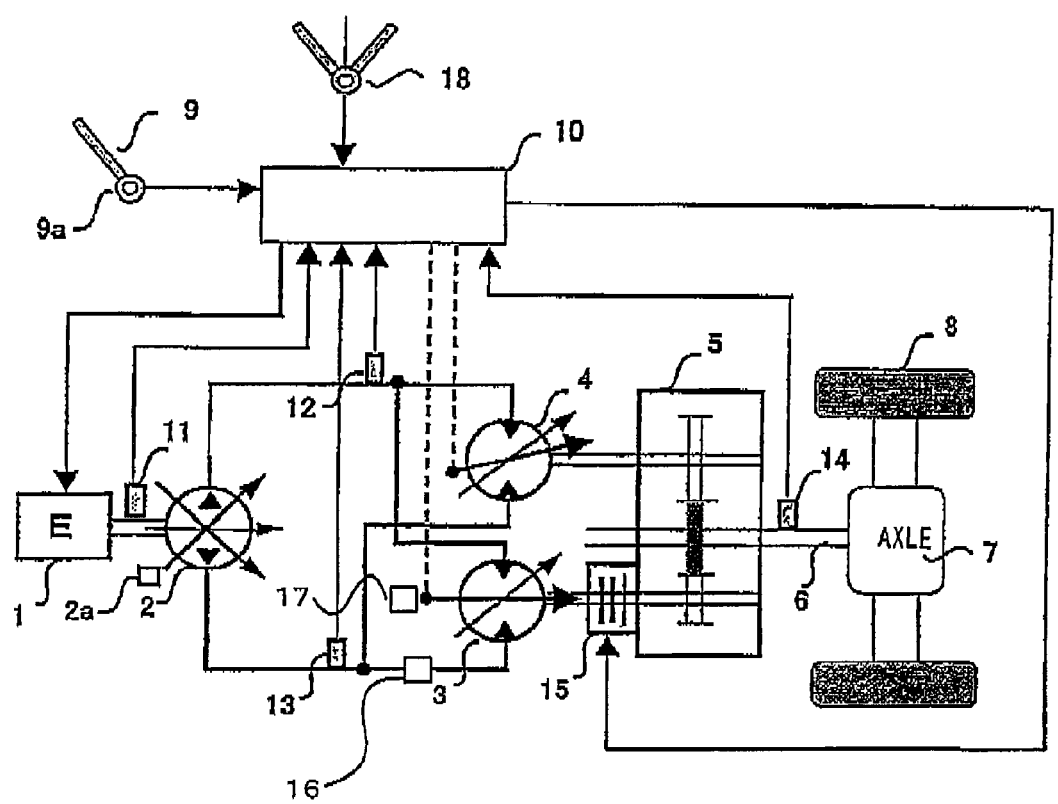
Figure 9:
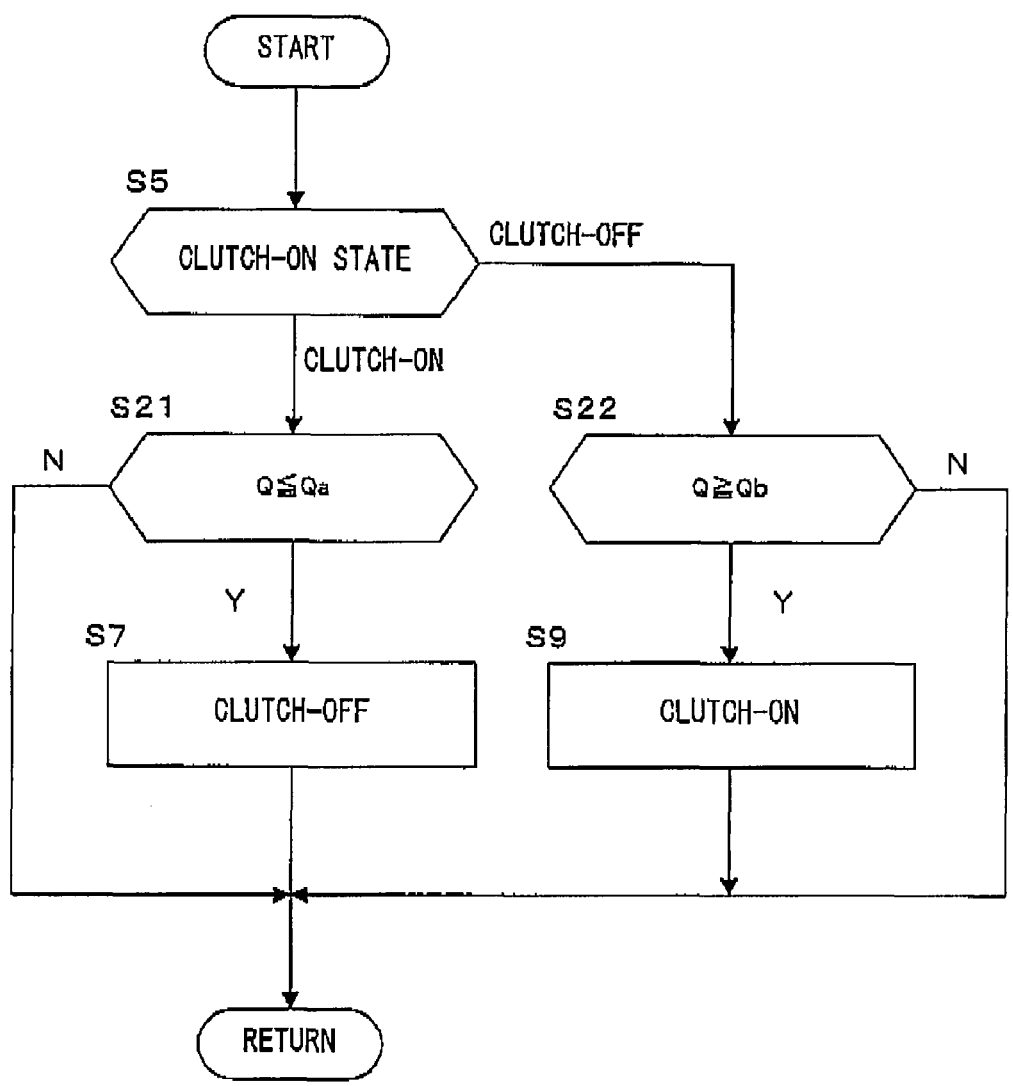

Since pressure oil does not pass through the first motor 3 when the loss torque at zero displacement is generated, the clutch device 15 may be controlled in accordance with flow rate through the first motor 3. In this case, as shown in FIG. 8, a flow rate sensor 16 may be provided in the hydraulic circuit so as to detect therewith flow rate through the first motor 3. FIG. 9 is a flowchart showing an example of processing by the controller 10 related to the second modification. It is to be noted that the same reference numerals are assigned to processes identical to those in FIG. 6.

In FIG. 9, if it is judged that the clutch is on in the step S5, the flow of control proceeds to step S21, where it is judged as to whether or not a flow rate Q through the motor 3 detected by the flow rate sensor 16 is less than or equal to a predetermined value Qa (e.g., zero). If the judgement is affirmative in the step S21, the flow of control proceeds to the step S7, where the clutch device 15 is turned off. This prevents the clutch from being engaged at the zero displacement with the hydraulic motor 3, thereby preventing the loss torque at zero displacement from being generated.

On the other hand, if it is judged that the clutch is off in the step S5, the flow of control proceeds to a step S22, where it is judged as to whether or not the flow rate Q, detected by the flow rate sensor 16, is greater than or equal to a predetermined value Qb. The predetermined value Qb is set to greater than Qa for the purpose of control stability. If the judgement is affirmative in the step S22, the flow of control proceeds to the step S9, where the clutch device 15 is turned on. It is to be noted that although, in the above, the flow rate sensor 16 detects the flow rate through the motor 3, another flow rate sensor may be used.

—The Third Modification—

Figure 10:
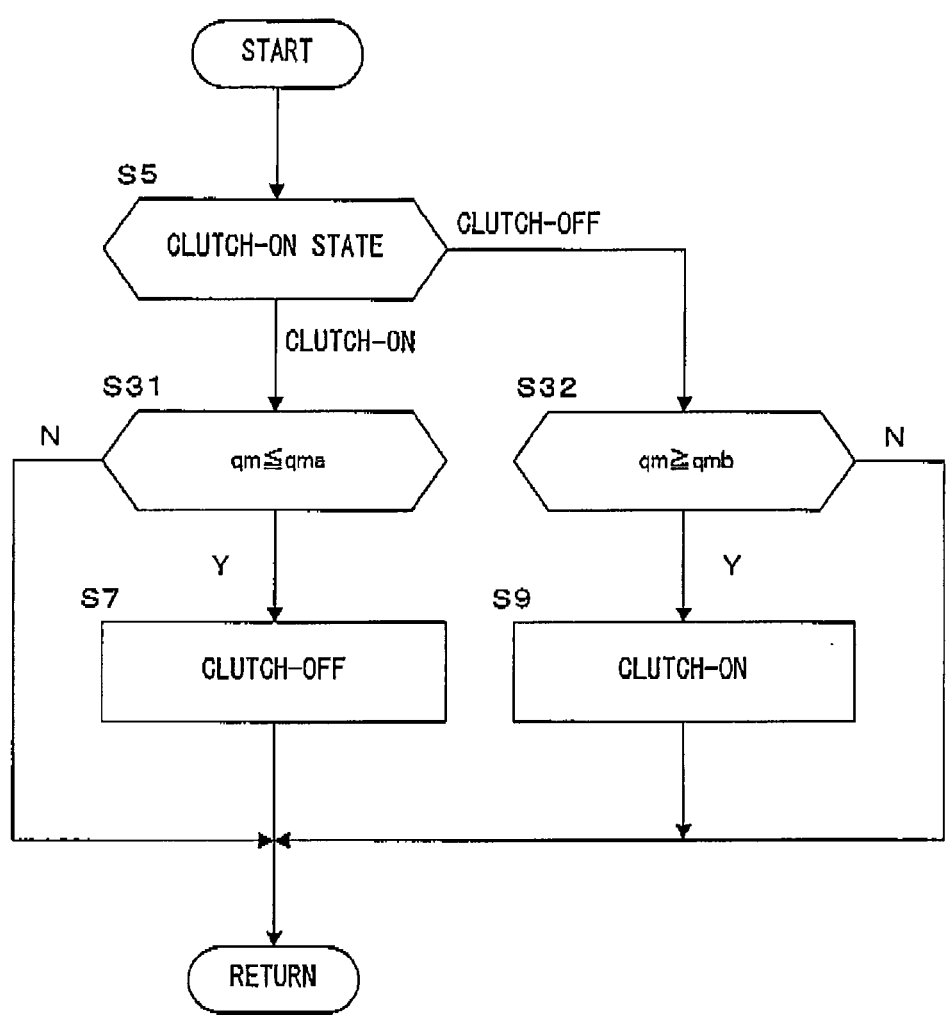

Since the displacement angle (tilting angle) of the first motor 3 becomes small when loss torque at zero displacement is generated, the clutch device 15 may be controlled in accordance with the displacement angle (tilting angle) of the first motor 3. In this case, as shown in FIG. 8, a displacement angle sensor 17 may detect the displacement angle qm of the first motor 3. FIG. 10 is a flowchart showing an example of processing by the controller 10 related to the third modification. It is to be noted that the same reference numerals are assigned to processes identical to those in FIG. 6.

In FIG. 10, if it is judged that the clutch is on in the step S5, the flow of control proceeds to a step S31, where it is judged as to whether or not the displacement angle qm detected by the displacement angle sensor 17 is less than or equal to a predetermined value qma (e.g., zero). If the judgement is affirmative in the step S31, the flow of control proceeds to the Step S7, where the clutch device 15 is turned off. This prevents the clutch from being engaged at the zero displacement with the hydraulic motor 3, thereby preventing the loss torque at zero displacement from being generated.

On the other hand, if it is judged that the clutch is off in the step S5, the flow of control proceeds to a step S32, where it is judged as to whether or not the displacement angle qm, detected by the displacement angle sensor 17, is greater than or equal to a predetermined value qmb. The predetermined value qmb is set to greater than qma for the purpose of control stability. If the judgement is affirmative in the step S32, the flow of control proceeds to the step S9, where the clutch device 15 is turned on. It is to be noted that although, in the above, the displacement angle sensor 17 detects the motor displacement angle, another displacement angle sensor may be used.

Although in the above embodiment a singularity of the first motor 3 (the first hydraulic motor), which is connected to the clutch device 15, and a singularity of the second motor 4 (the second hydraulic motor), which is not connected to the clutch device 15, are provided, a plurality of the first hydraulic motors and a plurality of the second hydraulic motors may be provided. In addition, although in the above embodiment the second motor 4, which serves as the second hydraulic motor, is a variable displacement type, it may be a fixed displacement type.

Although it is arranged that the displacement q1 of the first motor 3 is controlled between 0~qmax1 in response to a control signal from the controller 10, which serves as a displacement control device, the displacement q1 may be hydraulically controlled in accordance with the motor driving pressure P. It is to be noted that the case where the displacement q1 of the first motor 3 is equal to zero includes not only the case where q1 is precisely equal to zero but also the case where it is substantially equal to zero.

Although the clutch device 15 is provided between the first motor 3 and the gearbox 5, the arrangement of the clutch device 15 is not limited thereto as long as the drive-train between the first motor 3 and the travel drive shaft can be engaged or disengaged. Although the engine speed is detected by the rotation speed sensor 11 and the vehicle speed is detected by the vehicle speed sensor 14, the configurations of the engine speed sensor and the vehicle speed sensor are not limited thereto.

In the above embodiment, the clutch-off vehicle speed Voff is characterized (FIG. 5) by being set to the lower limit value V10 while the engine speed is in the low speed range which is less than Na, by increasing almost linearly with an increase in engine speed while the engine speed is in the middle speed range which is greater than or equal to Na and less than or equal to Nb, and by being set to the upper limit value while the engine speed is in the high speed range which is greater than Nb. The clutch device 15 is controlled in accordance with this characteristics. However, the configuration of the controller 10 as a clutch controller is not limited to the one described above, provided that when the vehicle speed increases the clutch device 15 is turned Off at the first vehicle speed (v1) by detecting the first engine speed (e.g., N1), and that when the vehicle speed increases the clutch device 15 is turned off at the second vehicle speed (v3), which is less than the first vehicle speed, by detecting the second engine speed (e.g., N3), which is less than the first engine speed. It is to be noted that the second vehicle speed in this case is greater than zero.

Although it is arranged that, as FIG. 5 shows, the clutch device 15 is engaged at V20 (the third vehicle speed), which is less than v10 (the first vehicle speed), if the engine speed is Na (the first engine speed) when the vehicle speed increases, and that the clutch device 15 is engaged at V21 (the fourth vehicle speed), which is less than v11 (the second vehicle speed), if the engine speed is Nb (the second engine speed) when the vehicle speed increases, the characteristics of the clutch device 15 are not limited thereto.

Although, in the above, an example in which the clutch control device of the present invention is applied to a wheel loader is explained, the present invention may be applied in the same manner to other hydraulically driven vehicles such as a forklift. In other words, the present invention is not limited to the clutch control device of the embodiment as long as features and functions of the present invention are achieved.

The disclosures of the following priority applications are herein incorporated by reference:
Japanese Patent Application No. 2007-30145 (filed on 9 Feb. 2007)

The invention claimed is:

1. A clutch control device for hydraulically driven vehicle, comprising:
    a hydraulic pump that is driven by an engine;
    a first variable displacement hydraulic motor that is connected to the hydraulic pump in a closed-circuit and is driven by pressure oil from the hydraulic pump;
    a second hydraulic motor, which is one of a variable displacement type and a fixed displacement type, that is connected in parallel to the first hydraulic motor and is driven by pressure oil from the hydraulic pump;
    a travel drive shaft that is driven by outputs of the first hydraulic motor and the second hydraulic motor;
    a displacement control device that controls displacement of the first hydraulic motor between zero and a maximum displacement in accordance with load;
    a clutch device that engages or disengages a drive-train between the first hydraulic motor and the travel drive shaft;
    an engine speed detection unit that detects rotational speed of the engine;
    a vehicle speed detection unit that detects vehicle speed; and
    a clutch control unit that controls the clutch device in response to detected engine speed and vehicle speed, wherein:
    the clutch control unit controls the clutch device when vehicle speed increases so as to disengage the drive-train at a first vehicle speed in the case where a first engine speed has been detected, and so as to disengage the drive-train at a second vehicle speed, which is less than the first vehicle speed, in the case where a second engine speed, which is less than the first engine speed, has been detected.

2. A clutch control device for hydraulically driven vehicle according to claim 1, wherein:
    the clutch control unit controls the clutch device so that the vehicle speed at which the drive-train is disengaged increases substantially linearly with an increase in engine speed.

3. A clutch control device for hydraulically driven vehicle according to claim 1, wherein:
    the clutch control unit controls the clutch device so as to engage the drive-train regardless of engine speed when the detected vehicle speed is less than a predetermined lower limit vehicle speed and so as to disengage the drive-train regardless of engine speed when the detected vehicle speed is greater than a predetermined upper limit vehicle speed.

4. A clutch control device for hydraulically driven vehicle according to claim 1, further comprising:
    a setting unit that sets vehicle speed at which the drive-train is disengaged to a predetermined lower limit value regardless of engine speed when an engine speed is in a low speed range, increases substantially linearly vehicle speed at which the drive-train is disengaged with an increase in engine speed when an engine speed is in a middle speed range, and sets vehicle speed at which the drive-train is disengaged to a predetermined upper limit value regardless of engine speed when an engine speed is in a high speed range, wherein:
    the clutch control unit controls the clutch device according to characteristics set by the setting unit.

5. A clutch control device for hydraulically driven vehicle according to claim 1, wherein:
    after the drive-train is disengaged, when vehicle speed decreases the clutch control unit engages the drive-train at a third vehicle speed which is less than the first vehicle speed in the case where the first engine speed has been detected, and engages the drive-train at a fourth vehicle speed which is less than the second vehicle speed in the case where the second engine speed has been detected.

6. A clutch control device for hydraulically driven vehicle according to claim 1, further comprising:
    an engine speed control device that increases engine speed with an increase in amount of operation of an accelerator pedal, wherein:
    the first engine speed corresponds to an engine speed at which the accelerator pedal is fully operated, and the second engine speed corresponds to an engine speed at which the accelerator pedal is half operated.

7. A clutch control device for hydraulically driven vehicle, comprising:
- a hydraulic pump that is driven by an engine;
- a first variable displacement hydraulic motor that is connected to the hydraulic pump in a closed-circuit and is driven by pressure oil from the hydraulic pump;
- a second hydraulic motor, which is one of a variable displacement type and a fixed displacement type, that is connected in parallel to the first hydraulic motor and is driven by pressure oil from the hydraulic pump;
- a travel drive shaft that is driven by outputs of the first hydraulic motor and the second hydraulic motor;
- a displacement control device that controls displacement of the first hydraulic motor between zero and a maximum displacement in accordance with load;
- a clutch device that engages or disengages a drive-train between the first hydraulic motor and the travel drive shaft;
- a pressure detection unit that detects load pressure exerted on the first hydraulic motor and the second hydraulic motor; and
- a clutch control unit that controls the clutch device so as to disengage the drive-train when a detected load pressure is less than or equal to a predetermined value.

8. A clutch control device for hydraulically driven vehicle, comprising:
- a hydraulic pump that is driven by an engine;
- a first variable displacement hydraulic motor that is connected to the hydraulic pump in a closed-circuit and is driven by pressure oil from the hydraulic pump;
- a second hydraulic motor, which is one of a variable displacement type and a fixed displacement type, that is connected in parallel to the first hydraulic motor and is driven by pressure oil from the hydraulic pump;
- a travel drive shaft that is driven by outputs of the first hydraulic motor and the second hydraulic motor;
- a displacement control device that controls displacement of the first hydraulic motor between zero and a maximum displacement in accordance with load;
- a clutch device that engages or disengages a drive-train between the first hydraulic motor and the travel drive shaft;
- a flow rate detection unit that detects flow rate flowing through the first hydraulic motor; and
- a clutch control unit that controls the clutch device so as to disengage the drive-train when a detected flow rate is less than or equal to a predetermined value.

9. A clutch control device for hydraulically driven vehicle, comprising:
- a hydraulic pump that is driven by an engine;
- a first variable displacement hydraulic motor that is connected to the hydraulic pump in a closed-circuit and is driven by pressure oil from the hydraulic pump;
- a second hydraulic motor, which is one of a variable displacement type and a fixed displacement type, that is connected in parallel to the first hydraulic motor and is driven by pressure oil from the hydraulic pump;
- a travel drive shaft that is driven by outputs of the first hydraulic motor and the second hydraulic motor;
- a displacement control device that controls displacement of the first hydraulic motor between zero and a maximum displacement in accordance with load;
- a clutch device that engages or disengages a drive-train between the first hydraulic motor and the travel drive shaft;
- a tilting angle detection unit that detects tilting angle of the first hydraulic motor; and
- a clutch control unit that controls the clutch device so as to disengage the drive-train when a detected tilting angle is less than or equal to a predetermined value.

* * * * *